(12) United States Patent
Bathon et al.

(10) Patent No.: US 10,742,148 B2
(45) Date of Patent: Aug. 11, 2020

(54) ELECTRIC GENERATOR

(71) Applicant: INNIO Jenbacher GmbH & Co OG, Jenbach, Tirol (AT)

(72) Inventors: Tobias Siegfried Bathon, Tirol (AT); Freddy Eduardo Alcazar Barrientos, Tirol (AT); Logeswaran Partheeban, Bangalore (IN)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 0 days.

(21) Appl. No.: 16/080,049

(22) PCT Filed: Mar. 22, 2017

(86) PCT No.: PCT/EP2017/056889
§ 371 (c)(1),
(2) Date: Aug. 27, 2018

(87) PCT Pub. No.: WO2017/162780
PCT Pub. Date: Sep. 28, 2017

(65) Prior Publication Data
US 2019/0068096 A1 Feb. 28, 2019

(30) Foreign Application Priority Data
Mar. 24, 2016 (AT) .................. 50242/2016

(51) Int. Cl.
*H02P 9/10* (2006.01)
*F03D 9/25* (2016.01)
(Continued)

(52) U.S. Cl.
CPC ............... *H02P 9/107* (2013.01); *F03D 9/25* (2016.05); *H02P 9/10* (2013.01); *H02P 2101/10* (2015.01); *H02P 2101/15* (2015.01)

(58) Field of Classification Search
CPC ............... H02P 9/107; H02P 9/10; F03D 9/25
See application file for complete search history.

(56) References Cited

U.S. PATENT DOCUMENTS 8,482,238 B2 7/2013 Xie et al.
8,967,857 B2 3/2015 Senoo
(Continued)

FOREIGN PATENT DOCUMENTS

CN 101345455 A 1/2009
DE 102013013081 A1 2/2014
(Continued)

OTHER PUBLICATIONS

International Search Report and Written Opinion issued in connection with corresponding PCT Application No. PCT/EP20171056889 dated Jul. 4, 2017.
(Continued)

*Primary Examiner* — Viet P Nguyen
(74) *Attorney, Agent, or Firm* — Fletcher Yoder, P.C.

(57) ABSTRACT

An electric rotating machine having a stator and a rotor, wherein the rotor is provided with rotor windings connected to electric contacts to carry a field current. A control device is provided to adjust the field current carried by the rotor windings. At least one sensor is provided to give information about the temperature at the location of the at least one sensor. The at least one sensor is located on or embedded in the rotor windings, and the at least one sensor is connected to the control device such that the control device is able to read the information given by the at least one sensor. The control device is further arranged to adjust the field current carried by the rotor windings and/or power output or power input of the electric rotating machine based on the information given by the at least one sensor.

19 Claims, 3 Drawing Sheets

(51) Int. Cl.
  *H02P 101/10* (2015.01)
  *H02P 101/15* (2016.01)

(56) References Cited

U.S. PATENT DOCUMENTS

| | | | |
|---|---|---|---|
| 9,484,791 B2 | 11/2016 | Brockerhoff et al. | |
| 10,224,861 B2* | 3/2019 | Granziera | H02P 9/107 |
| 2009/0121483 A1* | 5/2009 | Xiong | F03D 7/0272 |
| | | | 290/44 |
| 2011/0050141 A1* | 3/2011 | Yeh | H02P 29/664 |
| | | | 318/434 |
| 2011/0148119 A1* | 6/2011 | Fischer | H02K 5/1735 |
| | | | 290/55 |
| 2012/0133313 A1 | 5/2012 | Xie et al. | |
| 2014/0042876 A1 | 2/2014 | Brockerhoff et al. | |
| 2014/0176087 A1* | 6/2014 | Mouni | H02P 9/102 |
| | | | 322/59 |
| 2015/0188472 A1* | 7/2015 | Laursen | H02P 9/107 |
| | | | 318/400.02 |
| 2015/0252805 A1 | 9/2015 | Burnham et al. | |
| 2016/0276896 A1* | 9/2016 | Morrison | H02K 7/003 |
| 2017/0126167 A1* | 5/2017 | Simili | H02P 21/141 |

FOREIGN PATENT DOCUMENTS

| | | |
|---|---|---|
| EP | 2853873 A1 | 4/2015 |
| JP | 2001086716 A | 3/2001 |
| WO | 00/67358 A1 | 11/2000 |
| WO | 01/17085 A1 | 3/2001 |

OTHER PUBLICATIONS

International Preliminary Report on Patentability issued in connection with corresponding PCT Application No. PCT/EP20171056889 dated Sep. 25, 2018.

Austrian Office Action for AT Application No. A50242/2016 dated Mar. 9, 2017; 2 pgs.

* cited by examiner

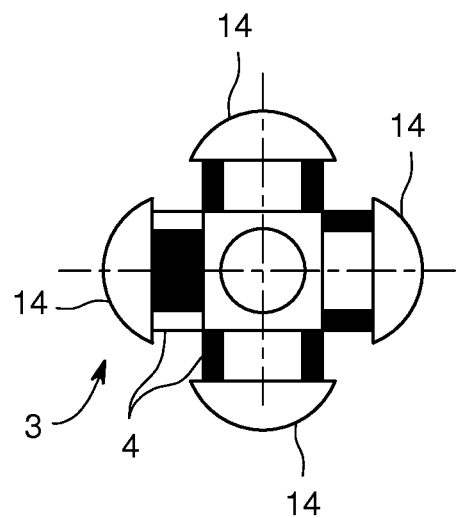
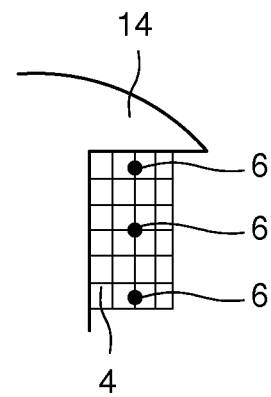
FIG. 3A  FIG. 3B
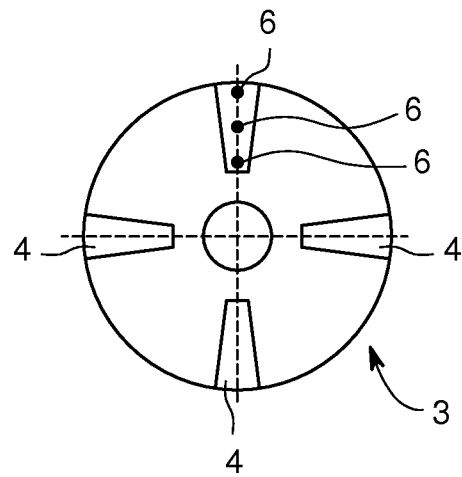
FIG. 3C
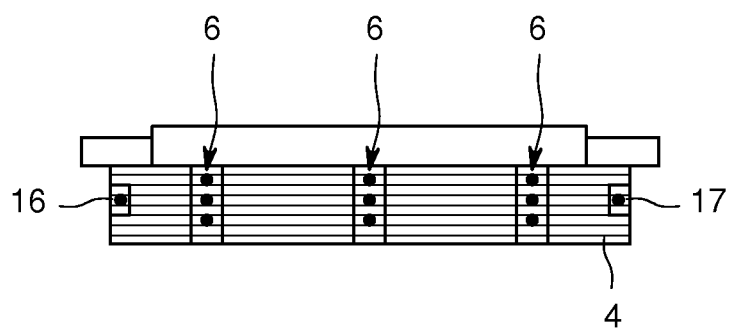
FIG. 3D

ELECTRIC GENERATOR

TECHNOLOGY FIELD

This disclosure relates to an electric rotating machine with the features of the preamble of claim 1 and a genset comprising such an electric rotating machine.

BACKGROUND

Electric rotating machine refers to both generators and motors.

It is known that generator rotor windings can overheat because of various generator operation conditions and failure modes. If the temperature gets too high, insulation between the rotor windings can deteriorate leading to electric shortages.

The rotor of the electric rotating machine can be considered of any art such as salient pole, round rotor, squirrel cage, cylindrical, etc.

Prior art concentrates on:

estimating rotor temperature by measurement of rotor current, and controlling the temperature by varying the output load of the generator.

U.S. Pat. No. 8,967,857 B2 shows a temperature detection device that detects a temperature of a rotor of a motor by measuring rotor current.

U.S. Pat. No. 3,358,208 shows a method for controlling temperature rise in rotor windings by varying the output load.

US 2012/0133313 A1 describes a generator provided with a rotor temperature rise estimation device.

U.S. Pat. No. 8,482,238 B2 describes a system and method for estimating a generator rotor temperature in an electric drive machine.

SUMMARY OF THE DISCLOSURE

A prime mover is defined as the source of mechanical torque to an electric generator, coming from any source such as a gas turbine, reciprocating engine (diesel or gas), hydro turbine, wind turbine, and all other generation sources. A genset is comprised by an electric generator and a prime mover connected by a shaft to transfer torque.

It is an object of the disclosure to provide an electric rotating machine and a genset where it is possible to control the temperature of the rotor windings more reliably.

This object is being accomplished by an electric generator having the features of claim 1 and a genset comprising such an electric generator. Advantageous embodiments of the disclosure are defined in the dependent claims.

This disclosure differs from the prior art by:

measuring directly the rotor windings temperature by using temperature sensors arranged or in the rotor windings; and controlling rotor windings temperature in reaction to the measured temperatures by varying the field current and/or output power.

It can be provided that the control device is being arranged to reduce the field current carried by the rotor windings and/or power output of the electric generator if the temperature at the location of the at least one sensor reaches or exceeds a given threshold. In this way overheating of the rotor can be avoided. Any one of these measures leads to a decrease in temperature of the rotor windings and thus avoids overheating.

It can be provided that there is a plurality of sensors, the sensors of the plurality being arranged at different positions on or in the rotor windings. The sensors can be placed at so-called hotspots. These are positions where temperature maxima are to be expected.

It can be provided that the at least one sensor is of a passive type, and wherein there is provided an emitter arranged to send a frequency signal, the frequency signal being changed at the position of the at least one sensor depending on the temperature at the location of the at least one sensor, and wherein the at least sensor is arranged to retransmit the changed frequency signal. No wiring of the sensors is necessary. An example for a sensor of a passive type is a so-called SAW-sensor (surface acoustic wave sensor) which uses and modulates surface acoustic waves to sense physical properties.

It can be provided that the at least one sensor is of an active type (such as thermocouples, RTDs, etc.).

It can be provided that the connection between the control device and the at least sensor comprises slip rings and wires leading from the sensors to the slip rings and from the slip rings to the control unit.

It can be provided that the connection between the control device and the at least sensor comprises at least one passive or active sensor. It can be used together with slip rings, e.g., to transmit the information from the slip rings to the control unit, or without slip rings.

The control unit can be part of an excitation control system of the electric generator. For a genset, it can be part of an electronic control unit of the genset.

BRIEF DESCRIPTION OF THE DRAWINGS

Embodiments of the disclosure are shown in FIGS. 1 to 3:

FIG. 3A, FIG. 3B, FIG. 3C and FIG. 3D show possible placements for the sensors 6 at the top, bottom, or center of a rotor winding 4 for a rotor 3 of the salient pole type (FIGS. 3A, 3B and 3C, FIG. 3B shows a detail of FIG. 3A, and FIG. 3D shows a cross section through the rotor 3 of FIG. 3A) and of the non-salient pole type (FIG. 3C).

DETAILED DESCRIPTION

Figure 1:
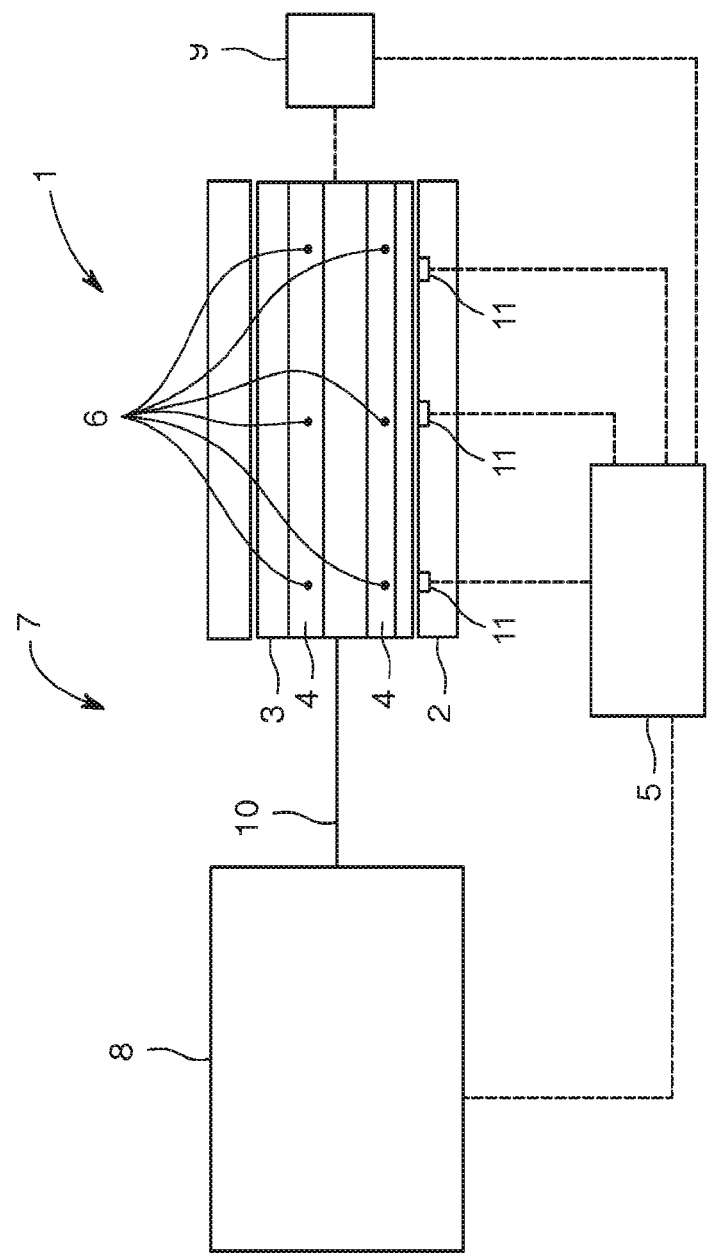
FIG. 1 shows schematically an embodiment of a genset.

FIG. 1 shows schematically an embodiment of a genset 7 having an electric rotating machine 1 in the form of an electric generator and a prime mover 8 (in particular a combustion engine such as a gas or diesel engine having a plurality of pistons arranged movably in combustion cylinders) to drive the electric generator via coupling 10. The electric generator comprises a stator 2 and a rotor 3, the rotor 3 having several rotor windings 4 (two of which are shown in FIG. 1 by way of example). A control unit 5 is arranged to receive information and to send commands as indicated by the dashed lines. In this embodiment the control unit 5 is arranged as an electronic control unit of the complete genset 7.

In this embodiment a plurality of passive sensors 6 (six of which are shown in FIG. 1 by way of example) is arranged on and within the rotor windings 4. There are provided emitter/receiver-units 11 (three of which are shown in FIG. 1 by way of example) arranged to send a frequency signal upon a command of the control unit 5, the frequency signal being changed at the position of sensors 6 depending on the temperature at the location of the sensors 6. The sensors 6 retransmit the changed frequency signals which can be received by the emitter/receiver-units 11. No wiring of the sensors 6 is necessary.

If the control unit 5 concludes from the information provided by the sensor 6 via emitter/receiver-units 11 that the temperature at one or several of the locations of the sensors 6 reaches or exceeds a given thresholds it can:

command the prime mover 8 to reduce driving torque of the rotor 3; and/or command an excitation control unit 9 to reduce field current carried by the rotor windings 4

Figure 2:
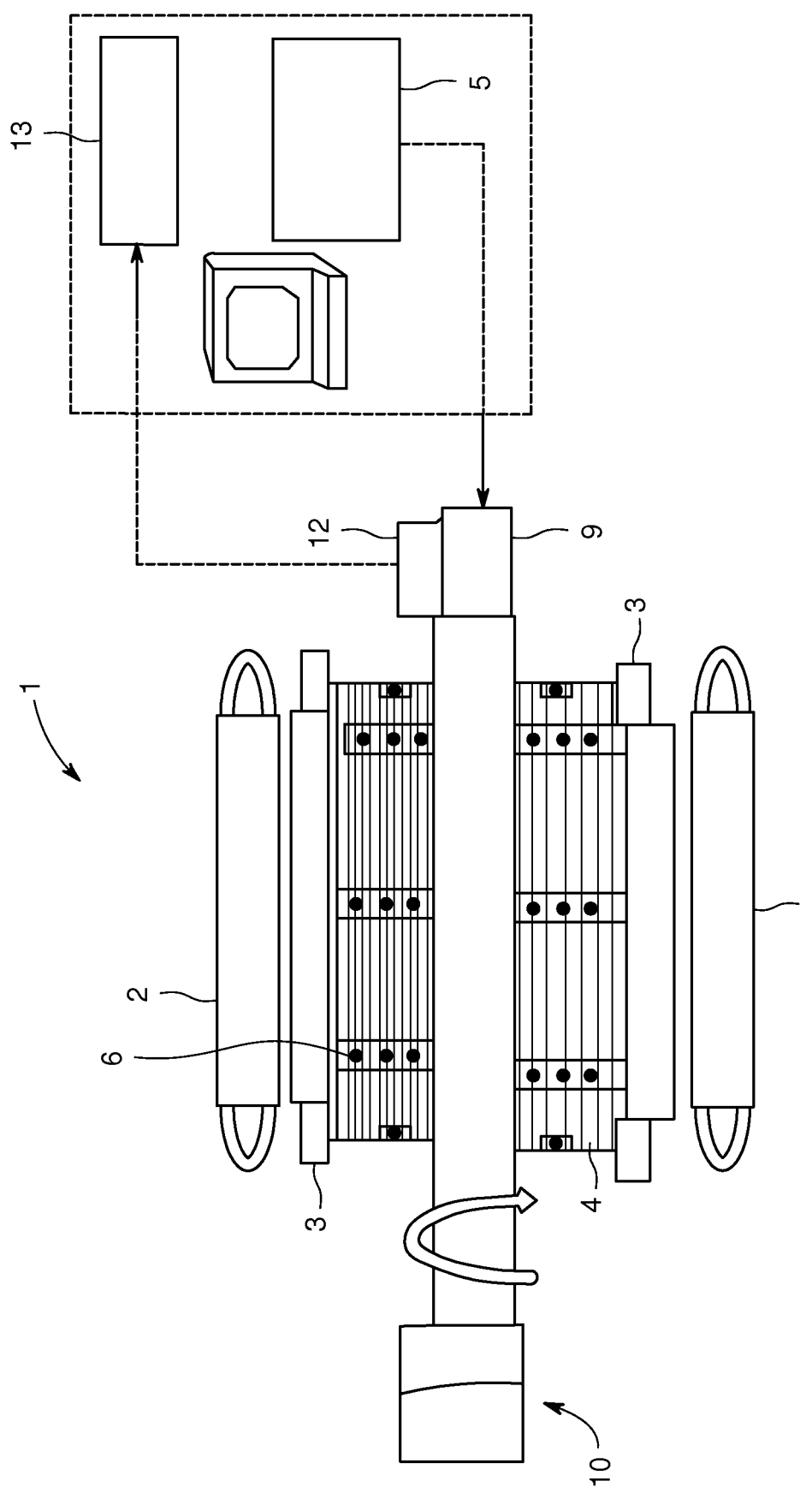
FIG. 2 shows an electric generator having a stator 2 and a rotor 3.

FIG. 2 shows an electric generator having a stator 2 and a rotor 3 the rotor 3 being provided with rotor windings 4. The rotor 3 can be driven by a prime mover (not shown, e.g., a combustion engine) via coupling 10. A plurality of sensors 6 located at different positions on and in the rotor windings 4 is shown. Control unit 5 can command a decrease of the field current carried by rotor windings 4 to decrease their temperature and/or to decrease output power of the electric generator.

As noted above, FIG. 3A to 3D show possible placements for the sensors 6 at the top, bottom, or center of a rotor winding 4 for a rotor 3 of the salient pole type (FIGS. 3A, 3B and 3C, FIG. 3B shows a detail of FIG. 3A, here by way of example four poles 14 are shown, FIG. 3D shows a cross section through the rotor 3 of FIG. 3A) and of the non-salient pole type (FIG. 3C).

In FIG. 3D, the outer left plurality of sensors 6 is arranged at a drive end (DE) side, the centre plurality of sensors 6 is arranged at a core pack and the outer right plurality of sensor 6 is arranged at a non drive end (NDE) core. Reference sign 16 denotes a DE section of winding, reference sign 17 shows an NDE section of winding.

What we claim is:

1. An electric rotating machine comprising:
   a stator and a rotor, wherein the rotor comprises rotor windings connected to electric contacts to carry a field current;
   at least one sensor disposed at a location on or embedded in the rotor windings;
   an emitter configured to send a frequency signal toward the at least one sensor, wherein the frequency signal changes in response to a temperature at a location of the at least one sensor, the at least one sensor is configured to transmit information comprising a changed frequency signal caused by the changes of the frequency signal, and the changed frequency signal is indicative of the temperature at the location; and
   a control device configured to adjust the field current carried by the rotor windings, and/or power output or power input of the electric rotating machine based on the information transmitted by the at least one sensor.

2. The electric rotating machine according to claim 1, wherein the control device is configured to reduce the field current carried by the rotor windings and/or power output or power input of the electric rotating machine if the temperature at the location of the at least one sensor reaches or exceeds a given threshold.

3. The electric rotating machine according to claim 1, wherein the at least one sensor comprises a plurality of sensors, and the plurality of sensors is arranged at different positions on or in the rotor windings.

4. The electric rotating machine according to claim 3, wherein the different positions of the plurality of sensors comprise different radial positions relative to a central axis of the rotor.

5. The electric rotating machine according to claim 4, wherein the different radial positions comprise first, second, and third radial positions relative to the central axis of the rotor.

6. The electric rotating machine according to claim 4, wherein the different positions of the plurality of sensors comprise different axial positions and different circumferential positions.

7. The electric rotating machine according to claim 1, wherein the at least one sensor is of a passive type.

8. The electric rotating machine according to claim 1, wherein the control device and the at least one sensor are communicatively coupled together by slip rings and wires leading to the slip rings.

9. The electric rotating machine according to claim 1, wherein the electric machine comprises an electric generator.

10. The electric rotating machine according to claim 1, comprising: an electric generator and a prime mover connected by a shaft to the electric generator to transfer torque, wherein the electric generator or the prime mover comprises the stator and the rotor.

11. The electric rotating machine according to claim 1, wherein the frequency signal comprises an acoustic wave.

12. The electric rotating machine according to claim 11, wherein the at least one sensor comprises a surface acoustic wave sensor.

13. An electric rotating machine comprising:
    a rotor comprising a plurality of rotor windings;
    a plurality of sensors configured to monitor the plurality of rotor windings at a plurality of locations; and
    an emitter configured to send a frequency signal toward the plurality of sensors;
    wherein the frequency signal changes in response to a temperature at each of the plurality of locations of the respective plurality of sensors, each of the plurality of sensors is configured to transmit information comprising a changed frequency signal caused by the changes of the frequency signal, and the changed frequency signal is indicative of the temperature at each of the plurality of locations.

14. The electric rotating machine according to claim 13, wherein the frequency signal comprises an acoustic wave.

15. The electric rotating machine according to claim 13, wherein each of the plurality of sensors comprises a surface acoustic wave sensor.

16. The electric rotating machine according to claim 13, wherein each of the plurality of sensors comprises a passive sensor.

17. The electric rotating machine according to claim 13, wherein the plurality of locations of the respective plurality of sensors comprise different radial positions relative to a central axis of the rotor.

18. The electric rotating machine according to claim 13, wherein the plurality of locations of the respective plurality of sensors comprise first, second, and third axial locations, wherein the first and second axial locations are disposed at axially opposite end portions of the plurality of rotor windings, wherein the third axial location is disposed at a central region between the axially opposite end portions of the plurality of rotor windings.

19. An electric rotating machine comprising:
    a rotor comprising a plurality of rotor windings;
    a plurality of sensors configured to monitor the plurality of rotor windings at a plurality of locations, wherein the plurality of locations of the respective plurality of sensors comprise different radial positions relative to a central axis of the rotor, different axial positions along the axis, and different circumferential positions about the axis;

wherein each of the plurality of sensors is configured to transmit information indicative of a temperature of the plurality of windings at a respective location of the plurality of locations; and an emitter configured to send a frequency signal toward the plurality of sensors, wherein the frequency signal changes in response to the temperature at each of the plurality of locations of the respective plurality of sensors, each of the plurality of sensors is configured to transmit the information comprising a changed frequency signal caused by the changes of the frequency signal, and the changed frequency signal is indicative of the temperature at each of the plurality of locations.

\* \* \* \* \*